United States Patent [19]

Stickel

[11] Patent Number: 4,597,741
[45] Date of Patent: Jul. 1, 1986

[54] APPARATUS FOR SIMULATION OF A FIELD OF VIEW

[75] Inventor: Robert Stickel, New Isenburg, Fed. Rep. of Germany

[73] Assignee: Honeywell

[21] Appl. No.: 597,945

[22] Filed: Apr. 9, 1984

[51] Int. Cl.$^4$ ............................................... G09B 9/00
[52] U.S. Cl. ......................................... 434/27; 358/88
[58] Field of Search ............................. 434/27; 358/88

[56] References Cited

U.S. PATENT DOCUMENTS

| | | | |
|---|---|---|---|
| 2,930,142 | 3/1960 | Domeshek | 434/27 |
| 3,626,404 | 12/1971 | Ophir et al. | 358/88 |
| 4,161,070 | 7/1979 | Pardes et al. | 434/27 |
| 4,424,529 | 1/1984 | Roese et al. | 358/88 |
| 4,437,745 | 3/1984 | Hajnal | 358/88 |

Primary Examiner—Richard C. Pinkham
Assistant Examiner—Leo P. Picard
Attorney, Agent, or Firm—Charles J. Ungemach

[57] ABSTRACT

Figure 4:
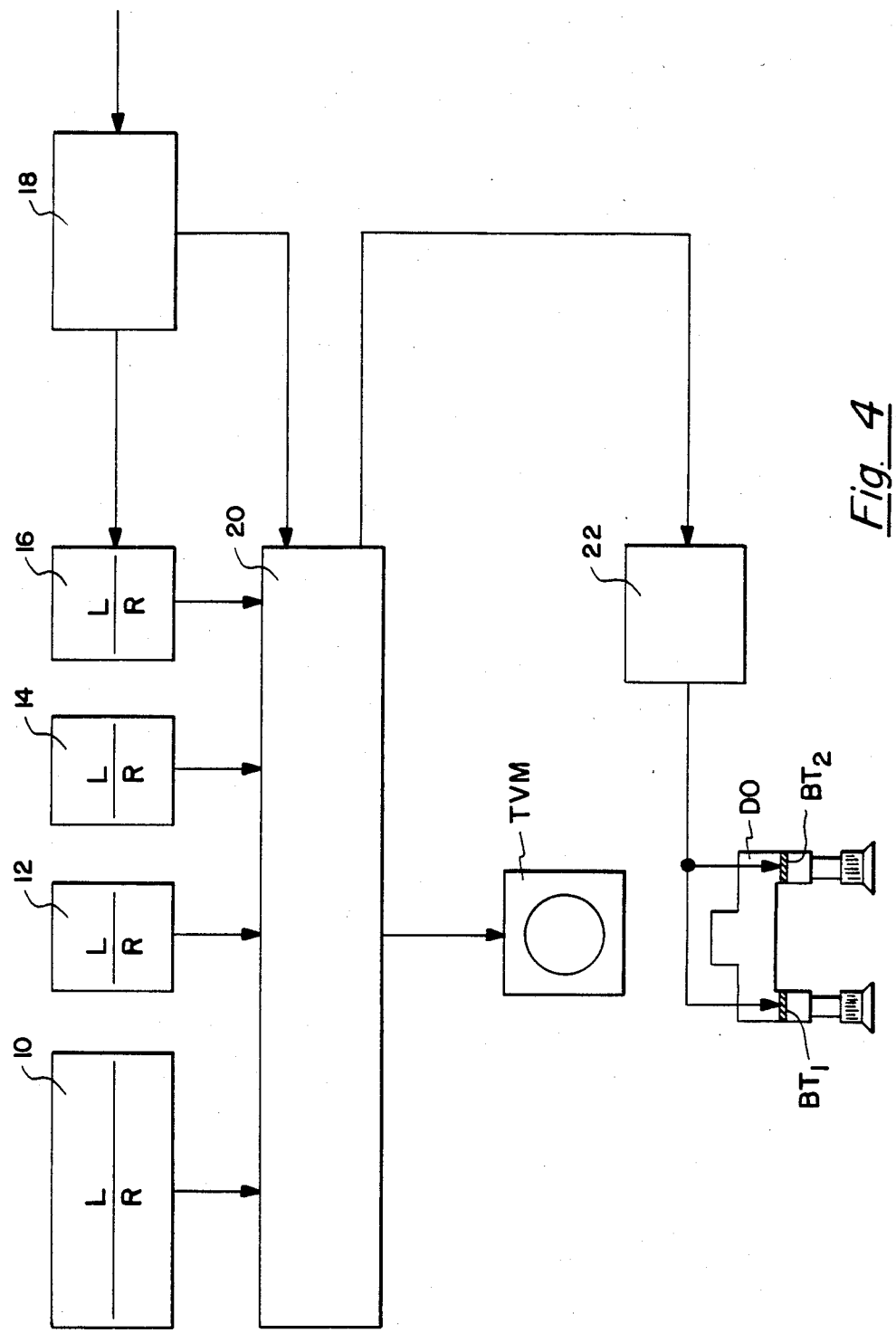

In a method for simulation of a field of view for battle training individual images of a terrain, targets, trajectories of projectiles and sights which are digitally stored in memories (10–16), after combining and digital/video conversion in an image synthesizing device (20), are displayed on a TV monitor (TVM). The images are stored as right and left half images, and they are displayed in a half image interlaced scanning. For simulation of a stereoscopic range meter preferably the sight memory (16) stores two half images of a stereoscopic index mark in addition. The image displacement of both half images is controlled as a function of range and a viewing unit (DO, BT1, BT2) serves to feed both half images on the TV monitor (TVM) to the eyes of the spectator (FIG. 4).

4 Claims, 4 Drawing Figures

APPARATUS FOR SIMULATION OF A FIELD OF VIEW

The present invention relates to an apparatus for simulation of a field of view for battle training purposes.

From DE-OS No. 31 33 866 a method for simulation of a field of view is known, at which for the purpose of training of a battle situation the image of a background is displayed on a TV monitor which is arranged in the field of view of an optics for the person to be trained and whereat the image of a moveable target is cut-in that background. The image of the background as well as the image of the target are digitally stored and after conversion into a video signal are displayed. In order to make the battle situation close to reality, individual objects within the background image as well as the targets image point-by-image point are provided with a range information so that by a comparison of said range information image point-by-image point the display of the targets is possible in front of or behind certain objects, respectively. Such a method is known in the art as computer synthesized imagery (CSI).

In a real battle situation frequently the range of a target is determined by means of a stereoscopic range meter in such a manner that by displacement of an index mark, the stereoscopic image of such a mark is adjusted to the same range as the target. The simulation of such a stereoscopic range meter, therefore, during the simulation of a battle situation is highly desirable.

It is, therefore, the object of the present invention to improve the known CSI method for simulation of a field of view in such a manner that a stereoscopic range meter also may be simulated.

Figure 1:
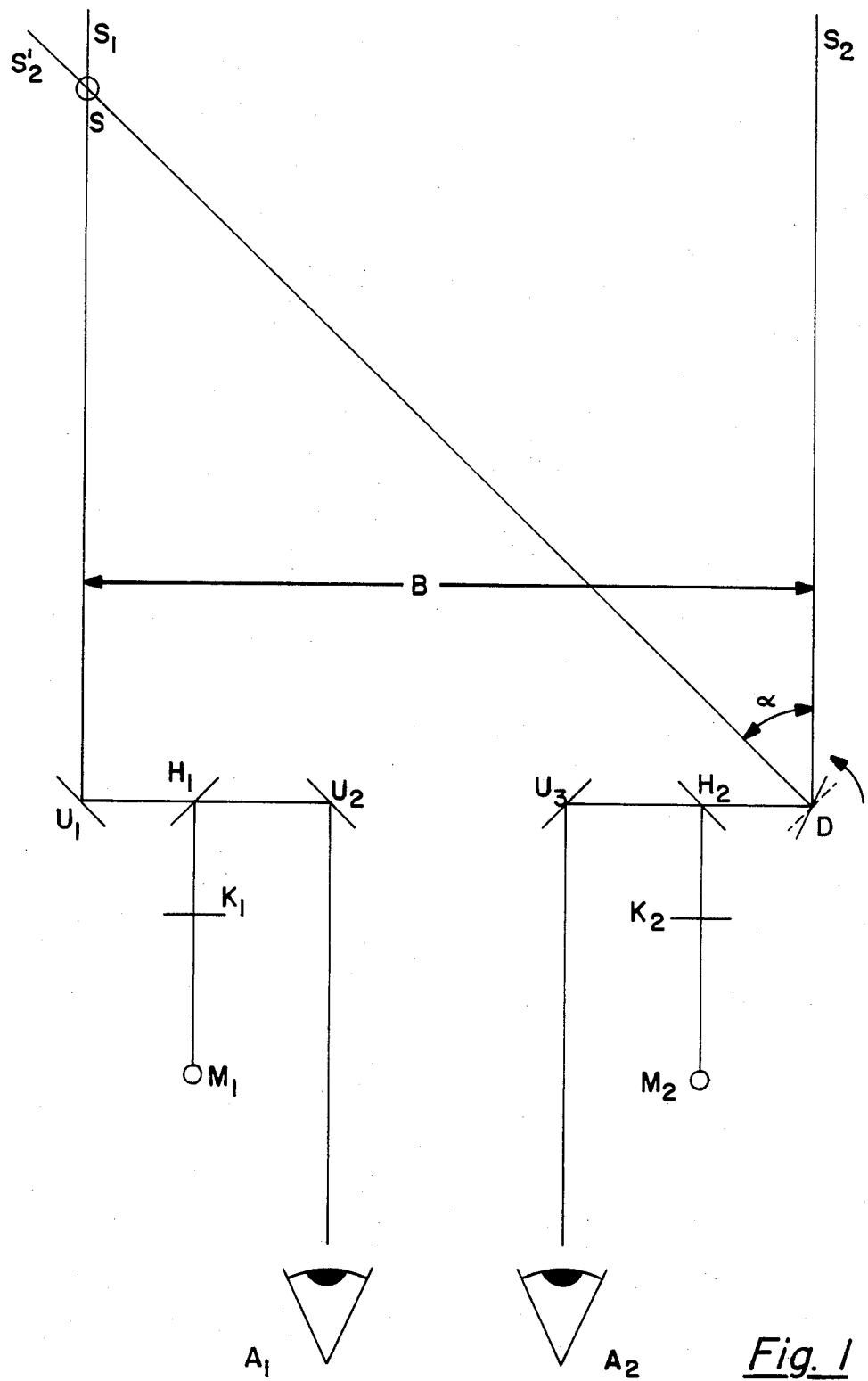
Figure 2:
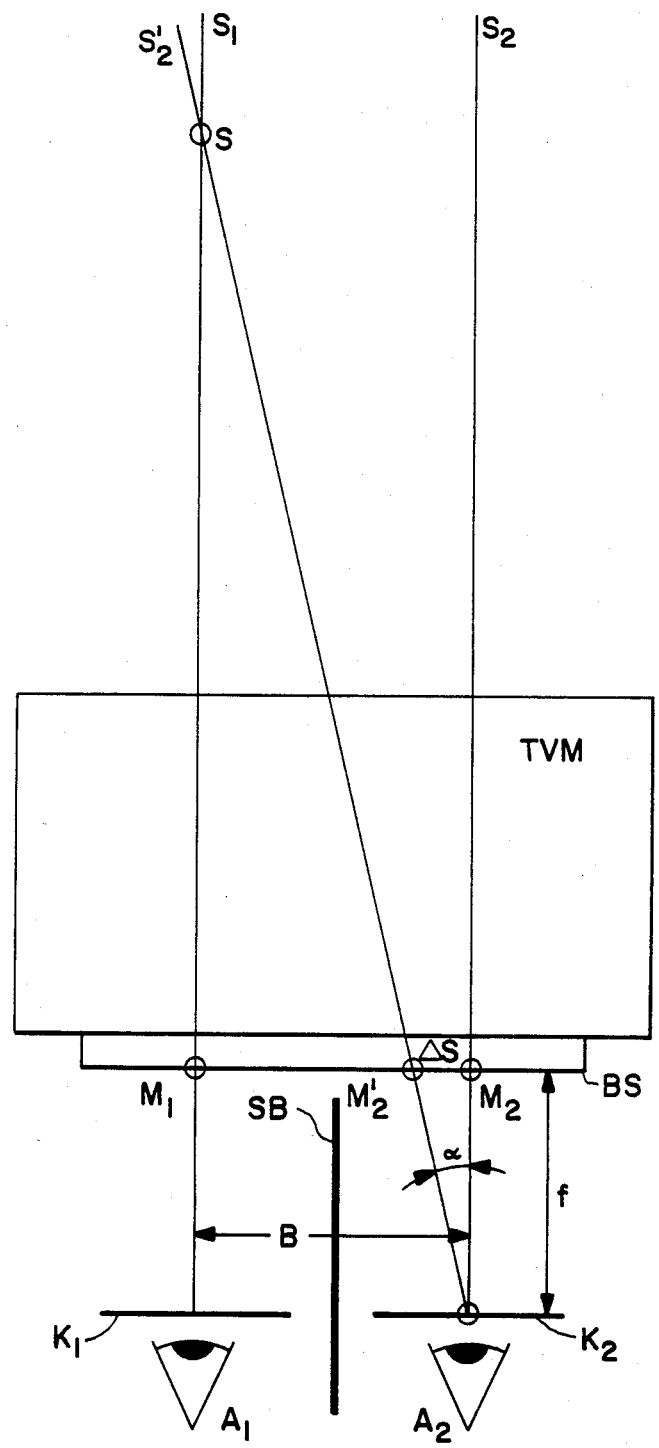
Figure 3:
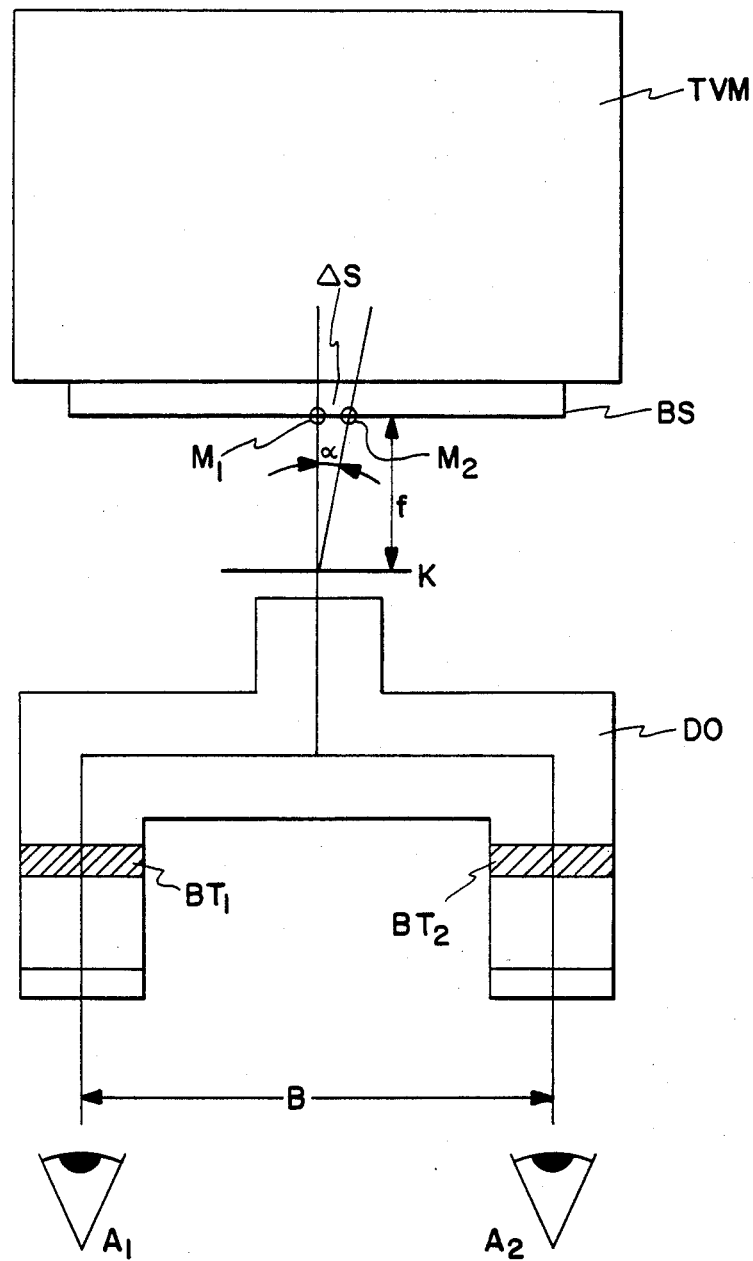

With respect to the figures of the attached drawing, in the following the principle of the stereoscopic range meter as well as its simulation shall be further explained. It shows:

FIG. 1 a sketch for explaining the operational principle of the stereoscopic range meter;

FIG. 2 a first apparatus for simulation of the stereocopic range meter;

FIG. 3 a second apparatus for simulation of the stereoscopic range meter; and

FIG. 4 further details of the apparatus according to FIG. 3.

FIG. 1 shows the principle of the stereoscopic range meter. To both eyes A1, A2 of a human spectator the images of two index marks M1, M2 are applied which are imaged stereoscoptically by means of collimators K1, K2, surface mirrors U1–U3, semitransparent mirrors H1 and H2 and by means of a rotating mirror D. With the dotted position of the rotating mirror D both index marks M1, M2 are forcussed for infinity by means of the beams S1, S2. Both index marks M1, M2 are merged by the eyes to a single mark which is also focussed for infinity. If the rotating mirror D has the position shown in full line, the index mark M2 is imaged under the angle α in direction of the beam S'2 and the eyes A1, A2 of the spectator merge both beams S1 and S'2 to the intersecting spot S. Now the intersecting spot of both index marks M1, M2 lies stereoscopically nearer to the spectator. At a given base B the range E as a function of the angle α may be computed according to the following relationship:

$$E = B/\tan \alpha \tag{1}$$

Therefore at a given base a range E is directly related to the position of the rotating mirror D. During a practical application, a spectator sets the stereoscopic index mark to the same range as the target in the terrain, and thereupon he is able to read the range of the target.

FIG. 2 shows a first apparatus with which the known stereoscopic range metal according to FIG. 1 may be simulated. To this end two stereoscopic index marks M1, M2 are fed as half images to the screen BS of a TV monitor TVM by an interlaced scanning. By means of a shield SB arranged symmetrically between both eyes A1, A2 both viewing channels are separated. The screen BS and the stereoscopic index marks M1, M2, which firstly have the same distance B as the eyes, are focussed to infinity by means of collimators K1, K2. For simulation of an index mark which is stereoscopically moving now a half image of the stereoscopic index mark is laterally displaced. By means of the displacement of the one stereoscopic index mark M'2 on the screen by a value ΔS in direction to the other stereoscopic index mark M1, its image is viewed in a direction which differs from the parallel viewing direction according to the range infinity by an angle $$\tan \alpha = \Delta S/f \tag{2}$$

whereat f represents the focal distance of the collimators K1, K2.

The stereoscopic index mark therefore appears under the following range:

$$e = (f \cdot B)/\Delta S \tag{3}$$

FIG. 3 shows an embodiment of a simulation apparatus of the stereoscopic range meter at which both viewing beams of the pair of eyes A1, A2 are separated by optical shutters BT1, BT2 within a diopter DO. The optical shutters BT1, BT2 are actuated in synchronism with the half image frequency. The screen BS of the TV monitor TVM again is focussed for infinity by means of collimator K. With a stereoscopic index mark focussed for infinity both half images of the stereoscopic index marks M1, M2 overlap. If the stereoscopic index mark moves nearer to the spectator, then the one stereoscopic index mark M2' must be displaced with respect to the other stereoscopic index mark M1 by the amount ΔS.

FIG. 4 shows a block diagram of a simulator according to the invention in further details. Digital memories 10 to 16 serve to store the image of a terrain, of targets, of projectile trajectories and of the sight and the stereoscopic index marks, respectively, whereat the information in each case is present by means of right and left half images. Since the sight commonly is to be focussed for infinity, the left and right half image of the sight is displayed without lateral displacement. The same is not valid with respect to the stereoscopic index marks which preferably also are stored within the sight memory 16. Also the half images with respect to different objects within the terrain, with respect to the targets and the projectile trajectories, are laterally displaced as a function of their range in order to simulate a stereoscopic impression at their display.

The lateral displacement is controlled by means of a computer 18 as a function of the range. The half images of all memories 10–16 are combined within an image synthesis device 20 and after digital/video conversion are applied to the TV monitor TVM. A control unit 22 controls alternately and in synchronism with the half image frequency the optical shutters BT1, BT2 within the diopter DO so that a stereoscopic scene is presented to the spectator in which scene, for instance by the accordingly controlled stereoscopic index marks, a certain range may be related to a target within the terrain.

I claim:

1. Apparatus for simulating a field of view for battle training purposes having first means for digitally storing half images of various battle field objects and second means for converting the digitally stored images to video images in an interlaced scanning manner to display images on a television monitor for viewing by a spectator through an optical system, the improvement comprising:

means producing first and second half images of a stereoscoptic index mark for storage in said first means, so as to simulate the appearance of a stereoscopic range meter when interlaced by said second means and viewed through the optical system; and control means for controlling the image displacement of the half images of said index mark as a function of range, the optical system providing that each half image of the index mark be viewed in two light paths separately by each eye of the spectator.

2. Apparatus according to claim 1 wherein the optical system includes a diopter with optical shutters in the two light paths.

3. Apparatus according to claim 2 further including means to alternately actuate the two shutters in synchronism with the half images frequency.

4. Apparatus according to claim 2 further including a collimator positioned between the diopter and the televison monitor.

* * * * *

UNITED STATES PATENT AND TRADEMARK OFFICE
CERTIFICATE OF CORRECTION

PATENT NO. : 4,597,741
DATED     : July 1, 1986
INVENTOR(S) : Dr. Robert Stickel It is certified that error appears in the above-identified patent and that said Letters Patent is hereby corrected as shown below:

INID Code 73, delete "Honeywell" and insert--Honeywell G.m.b.H.--.

Column 3, line 17, delete "stereoscoptic" and insert--stereoscopic--.

Signed and Sealed this

Twenty-eighth Day of October, 1986

[SEAL]

*Attest:*

DONALD J. QUIGG

*Attesting Officer*        *Commissioner of Patents and Trademarks*